(12) United States Patent
Tice et al.

(10) Patent No.: US 8,859,671 B2
(45) Date of Patent: Oct. 14, 2014

(54) PHOTODEGRADABLE FILMS WITH GOOD TENSILE AND DART PROPERTIES

(75) Inventors: Colleen M Tice, Houston, TX (US); Teresa P. Karjala, Lake Jackson, TX (US); Lori L. Kardos, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 135 days.

(21) Appl. No.: 13/515,014

(22) PCT Filed: Dec. 7, 2010

(86) PCT No.: PCT/US2010/059167
§ 371 (c)(1),
(2), (4) Date: Jun. 11, 2012

(87) PCT Pub. No.: WO2011/071843
PCT Pub. Date: Jun. 16, 2011

(65) Prior Publication Data
US 2012/0289645 A1 Nov. 15, 2012

Related U.S. Application Data

(60) Provisional application No. 61/285,741, filed on Dec. 11, 2009.

(51) Int. Cl.
*C08L 23/08* (2006.01)

(52) U.S. Cl.
USPC ............ 524/502; 525/185; 526/352; 526/348

(58) Field of Classification Search
USPC ................... 524/502; 525/185; 526/352, 348
See application file for complete search history.

(56) References Cited

U.S. PATENT DOCUMENTS

| | | | |
|---|---|---|---|
| 3,456,044 A | 7/1969 | Pahlke | |
| 3,676,401 A | 7/1972 | Henry | |
| 3,860,538 A | 1/1975 | Guillet et al. | |
| 3,929,727 A | 12/1975 | Russell et al. | |
| 4,352,849 A | 10/1982 | Mueller | |
| 4,503,102 A | 3/1985 | Mollison | |
| 4,521,437 A | 6/1985 | Storms | |
| 4,714,741 A | 12/1987 | Balduff et al. | |
| 4,820,557 A | 4/1989 | Warren | |
| 4,927,708 A | 5/1990 | Herran et al. | |
| 4,952,451 A | 8/1990 | Mueller | |
| 4,962,164 A | 10/1990 | Jabarin et al. | |
| 4,963,419 A | 10/1990 | Lustig et al. | |
| 5,059,481 A | 10/1991 | Lustig et al. | |
| 5,272,236 A | 12/1993 | Lai et al. | |
| 5,278,272 A | 1/1994 | Lai et al. | |
| 5,685,128 A | 11/1997 | Chum et al. | |
| 5,707,751 A | 1/1998 | Garza et al. | |
| 5,852,152 A | 12/1998 | Walton et al. | |
| 5,972,444 A | 10/1999 | Patel et al. | |
| 5,986,028 A | 11/1999 | Lai et al. | |
| 6,306,969 B1 | 10/2001 | Patel et al. | |
| 6,558,809 B1 * | 5/2003 | Kelch et al. | ............. 428/520 |
| 7,355,089 B2 | 4/2008 | Chang et al. | |
| 7,422,786 B2 | 9/2008 | Ravel et al. | |
| 7,504,347 B2 | 3/2009 | Poon et al. | |
| 7,514,517 B2 | 4/2009 | Hoenig et al. | |
| 7,524,911 B2 | 4/2009 | Karjala et al. | |
| 7,579,408 B2 | 8/2009 | Walton et al. | |
| 7,582,716 B2 | 9/2009 | Liang et al. | |

FOREIGN PATENT DOCUMENTS

| | | | |
|---|---|---|---|
| DE | 2316697 | 11/1973 | |
| EP | 0230143 | 12/1989 | |
| EP | 0839645 A2 | 5/1998 | |
| EP | 1532203 | 2/2004 | |
| EP | 1529633 | 5/2005 | |
| GB | 1448062 | 9/1976 | |
| WO | 9118944 | 12/1991 | |
| WO | WO 91/18944 | * 12/1991 | ............ C08J 7/18 |
| WO | 96/06889 A1 | 3/1996 | |

OTHER PUBLICATIONS

Packaging Foods With Plastics by Wilmer A. Jenkins and James P. Harrington (1991), pp. 78-83.
The Encyclopedia of Chemical Technology, Kirk-Othmer, Third Edition, John Wiley & Sons, New York, 1981, vol. 16, pp. 416-417 and vol. 18, pp. 191-192.
The Wiley Encyclopedia of Packaging Technology by M. Bakker (Editor), John Wiley & Sons (1986), pp. 334, 364-369.
Packaging: An Introduction by S. Sacharow and A. L. Brody, Harcourt Brace Javanovich Publications, Inc. (1987), pp. 322-326).
Harlan, G. "Ethylene-carbon monoxide copolymers", Degradable Polymers 1995, pp. 154-168.

* cited by examiner

*Primary Examiner* — Robert D. Harlan
(74) *Attorney, Agent, or Firm* — Whyte Hirschboeck Dudek S.C.

(57) ABSTRACT

Film structures made from a polymeric blend comprising an ethylene/carbon monoxide (ECO) copolymer and an olefinic, particularly an ethylenic, polymer, e.g., LDPE, exhibit not only photodegradation, but also desirable tensile and dart properties. In one embodiment the film structure is a monolayer in which ECO copolymer comprises at least 40 weight percent with the remainder of the structure comprising at least one of LDPE, LLDPE and HDPE.

10 Claims, 2 Drawing Sheets

PHOTODEGRADABLE FILMS WITH GOOD TENSILE AND DART PROPERTIES

FIELD OF THE INVENTION

This invention relates to photodegradable films. In one aspect the invention relates to photodegradable films comprising a copolymer with units derived from ethylene and carbon monoxide (ECO copolymer) while in another aspect, the invention relates to industrial, consumer and food packaging films comprising an ECO copolymer.

BACKGROUND OF THE INVENTION

Ethylene/carbon monoxide copolymers have been known since at least as early as the 1940s, and their susceptibility to photodegradation has been know since at least as early the 1960s. The use of ECO copolymers in the manufacture of industrial and consumer packaging films has been reported since at least as early as the 1970s, e.g., U.S. Pat. Nos. 3,676,401, 3,929,727 and 4,714,741 and GB 1 448 062. However, notwithstanding the environmental friendly property of photodegradation, these copolymers have not achieved the expected acceptance in industrial and consumer packaging applications because of their less than desirable mechanical properties, particularly tensile and puncture resistance.

WO 91/18944 A1 describes the mixture of the anatase form of $TiO_2$ and a carbon monoxide containing olefin copolymer to enhance photodegradation of plastics and resins. U.S. Pat. No. 6,558,809 B1 describes a film made from substantially halogen free polymers that can be activated with high frequency electromagnetic energy. DE 23 16 697 A1 describes polymers and copolymers containing keto-carbonyl groups which are photodegradable on exposure to ultraviolet radiation. U.S. Pat. No. 4,714,741 describes an ethylene-carbon monoxide copolymer containing about 0.005 to 0.05 percent by weight of carbon monoxide and a low density polyethylene.

SUMMARY OF THE INVENTION

In one embodiment the invention is a film structure comprising an ethylene/carbon monoxide (ECO) copolymer and an olefinic, particularly an ethylenic, polymer other than an ECO copolymer. In one embodiment the ECO copolymer comprises at least 40, preferably at least 60 to 85, weight percent (wt %) of the film structure with the remainder of the structure comprising at least one olefinic, preferably ethylenic, polymer other than the ECO copolymer. Preferred olefinic polymers include, but are not limited to, low density polyethylene (LDPE), linear low density polyethylene (LLDPE) and high density polyethylene (HDPE). The film structure can either be a monolayer film in which the monolayer comprises both the ECO copolymer and other olefinic polymer, or a multilayer film in which (A) at least one of the layers comprises the ECO copolymer, and (B) at least one of the other layers comprises (1) an olefinic polymer other than an ECO copolymer, and (2) is free of ECO copolymer. In one embodiment the film structure of this invention is one of a shrink film, lamination film, liner film, consumer bag, agriculture film, food packaging film like form-fill-seal and bag-in-box structures, and heavy-duty shipping sacks (HDSS).

DETAILED DESCRIPTION OF THE PREFERRED EMBODIMENT

Definitions

Figure 1:
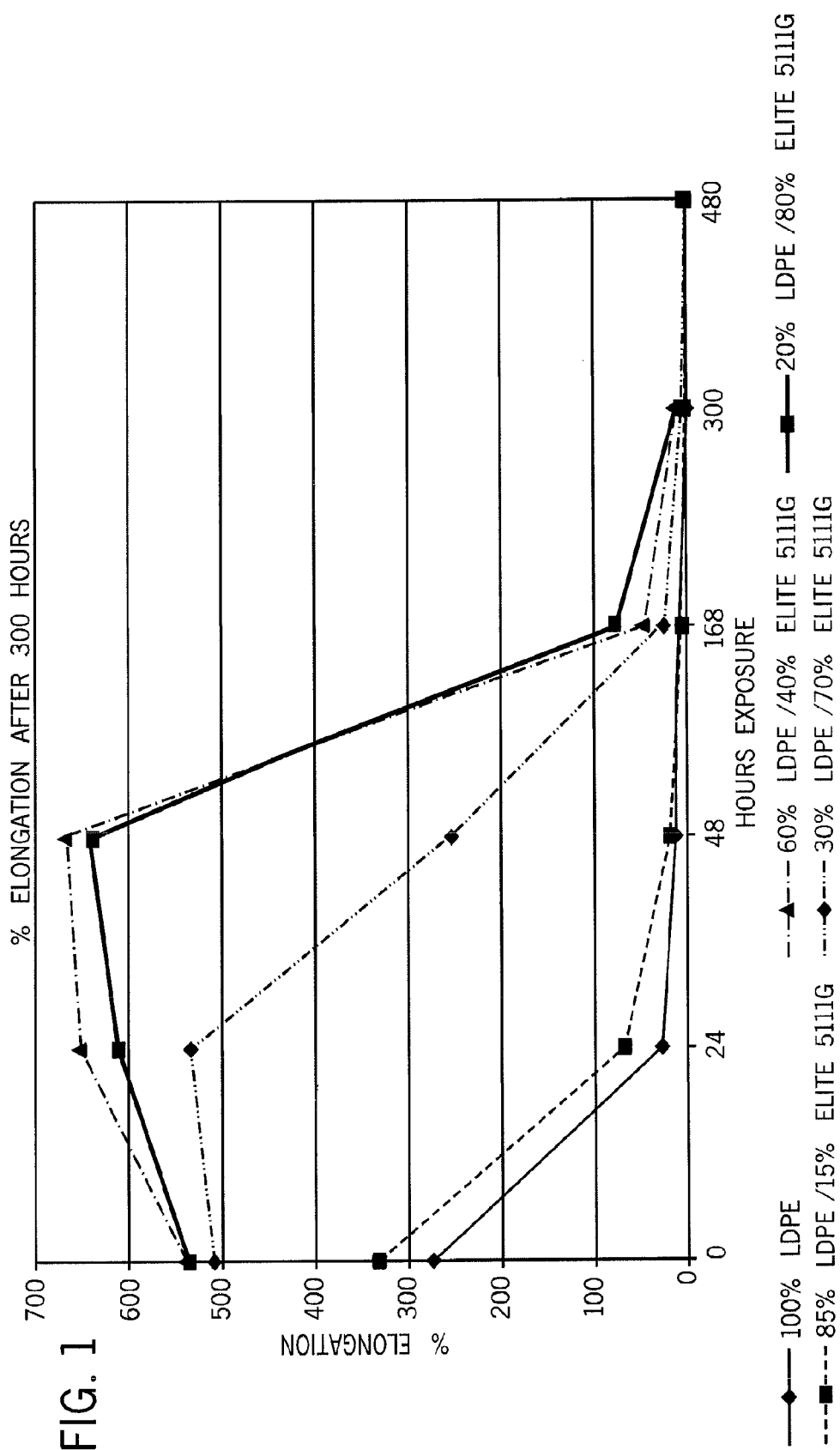
FIG. 1 is a line graph reporting the percent elongation of various inventive and comparative films after 300 hours of exposure to UV light on an accelerated QUV tester.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of units derived from carbon monoxide in the ECO copolymer, the amount of ECO copolymer in the film structure, and the various tensile and puncture properties of the film structures of this invention.

"Composition" and like terms mean a mixture or blend of two or more components.

"Polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" and like terms mean a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Olefinic polymer", "olefin-based polymer" and like terms mean a polymer that comprises 50 weight percent or more of polymerized olefin monomer (based on the total weight of polymer). The olefin monomer can comprise two or more different olefin monomers.

"Ethylene polymer," "ethylene-based polymer" and like terms means a polymer that comprises 50 weight percent or more of polymerized ethylene monomer (based on the total weight of polymer).

ECO Copolymer

The ECO copolymer used in the practice of this invention has a melt index ($I_2$, ASTM D1238 (190° C./2.16 kg)) typically of 0.1 to 12, more typically of 0.25 to 6 and even more typically of 0.25 to 1.5 grams per 10 minutes (g/10 min); a density (ASTM D792) typically of 0.91 to 0.95, more typically of 0.92 to 0.94 and even more typically of 0.922 to 0.935, grams per cubic centimeter (g/cc); and a carbon monoxide content typically of 0.1 to 18, more typically of 0.5 to 10 and even more typically of 1 to 3, weight percent of the copolymer as measured by infrared spectroscopy. One ECO copolymer useful in the practice of this invention is available from The Dow Chemical Company. It is an LDPE copolymer with a carbon monoxide content of 1 wt %, a melt index (MI or $I_2$) of 0.52 g/10 min, and a density of 0.93 g/cc. The carbon monoxide content of the ECO copolymer can be measured by any conventional technique, e.g., Fourier Transform Infrared Spectroscopy.

Olefinic Polymer

While the olefinic polymers that can be used in the practice of this invention include polymers based on a wide range of olefins, e.g., ethylene, propylene, butene and the like, the olefinic polymers of preference for use in this invention are the ethylenic polymers. These ethylenic polymers include both homopolymers and interpolymers, random and blocky copolymers, and functionalized (e.g., ethylene vinyl acetate, ethylene ethyl acrylate, etc.) and non-functionalized polymers. The ethylenic interpolymers include elastomers, flexomers and plastomers. The ethylene polymer comprises at least 50, preferably at least 60 and more preferably at least 80, wt % of units derived from ethylene. The other units of the ethylenic interpolymer are typically derived from one or more α-olefins. For purposes of this invention, ECO copolymers are not included in the definition of olefinic polymers.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethyleneic interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

Examples of ethylenic polymers useful in the practice of this invention include high density polyethylene (HDPE); medium density polyethylene (MDPE); low density polyethylene (LDPE); very low density polyethylene (VLDPE); homogeneously branched, linear ethylene/α-olefin copolymers (e.g. TAFMER® by Mitsui Petrochemicals Company Limited and EXACT® by DEX-Plastomers); homogeneously branched, substantially linear ethylene/α-olefin polymers (e.g., AFFINITY® polyolefin plastomers and ENGAGE® polyolefin elastomers available from The Dow Chemical Company); and ethylene block copolymers (INFUSE® also available from The Dow Chemical Company). The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582,716 and 7,504,347.

Olefinic interpolymers of particular interest for use in the practice of this invention are LDPE, linear low density polyethylene (LLDPE) and HDPE. These ethylenic copolymers are commercially available from a number of difference sources including The Dow Chemical Company under such trademarks as DOWLEX™, ATTANE™ and FLEXOMER™; Equistar/LyondellBasell under such trademarks as PETROTHENE; Nova Chemical Company under such trademarks as NOVAPOL and SCLAIR; and ExxonMobil Chemical Company under such trademarks as EXCEED, EXACT and ENABLE.

Film Structures

Useful film structures or articles of this invention include cast, blown, calendered and extrusion coated (including, but not limited to, multi-layer films, greenhouse films, shrink films including clarity shrink film, lamination film, biaxially-oriented film, extrusion coating, liners, clarity liners, overwrap film and agricultural film). Monolayer and multilayer films may be made according to the film structures and fabrication methods described in U.S. Pat. No. 5,685,128.

If the film structure is monolayer, then the ECO copolymer and olefinic interpolymer, e.g., LDPE, are blended with one another and optional additives (including one or more other polymers), if any, in any convenient manner, e.g., dry blending the individual components and subsequently melt mixing either directly in the extruder used to make the film or pre-melt mixing in a separate extruder, and fabricating into a film using any film producing process, e.g., blown film, cast film, etc. The ECO copolymer comprises at least 40, 50, 60, 70, 80 or 90 wt % of the ECO/olefinic polymer blend, with the olefinic copolymer comprising at least 1, 10, 20, 30 or 40 wt % of the blend. Of particular interest are monolayer film structures, or multi-layer film structures in which at least one film layer, is made from a composition comprising a blend of 60-85 wt % ECO copolymer with a CO content of 0.5-2 wt % and 40-15 wt % of at least One of LDPE, LLDPE and HDPE. In one embodiment the film structure is made from a polymeric blend comprising 40 to 90, preferably 60 to 85, wt % ECO copolymer and the 60 to 10, preferably 40 to 15, wt % LDPE, LLDPE or HDPE, preferably LLDPE.

If the film structure is multi-layer, then the ECO copolymer can comprise all (100 wt %) of one or more layers, but typically not of all layers, of the structure, or it can be present in one or more layers, including in each of the layers, of the structure as part of an ECO copolymer/olefinic polymer blend. In film structures in which one or more of the layers is without ECO copolymer, then those layers are typically positioned within the structure to have interfacial contact with at least one layer that does comprise ECO copolymer.

The films of this invention have many utilities, including over-wrapping films such as tissue over-wraps, bundled bottled water over-wraps; clarity films such as candy bags, bread bags, envelope window films; food and specialty packaging films, such as produce bags, meat wraps, cheese wraps, etc.; pouches such as milk pouch, bags-in-box such as wine and other vertical form fill and seal techniques such as those taught by Dow, DuPont and Exxon. Shrinkage films are particularly within the purview of the invention, and these can be made using a variety of techniques, such as double bubble films, tenter frame techniques, biaxial orientation techniques. The films of the invention can also be elastic.

Useful film structures are also suitably prepared from polymeric blends comprising an ECO copolymer, an ethylenic copolymer of at least one of LDPE, LLDPE and HDPE, and at least one other natural or synthetic polymer other than the ECO copolymer and ethylenic copolymer. Preferred other polymers include, but are not limited to, thermoplastics, such as styrene-butadiene block copolymers, polystyrene (including high impact polystyrene), ethylene vinyl alcohol copolymers, ethylene acrylic acid copolymers, polyamides, polyethers, polyurethanes, polyesters, cellulose, etc. If present, these other polymers typically comprise less than 50, more typically less than 40 and even more typically less than 20, wt % of the polymeric blend.

The ECO copolymer and olefinic polymer blend, either alone or in combination with one or more other polymers as described above, may be blended, if desired or necessary, with various additives such as antioxidants, ultraviolet absorbing agents, anti-fogging agents, antistatic agents, nucleating agents, lubricants, flame retardants, anti-blocking agents, colorants, inorganic or organic fillers or the like. If used, these additives are used in known manners and in known amounts including, but not limited to, addition as part of a masterbatch and in amounts typically of 0.01 to 10 or more wt % based on the total weight of the film structure (although fillers may be used in much larger amounts).

As noted above, the film structures of this invention may be made by conventional fabrication techniques, e.g. simple bubble extrusion, biaxial orientation processes (such as tenter frames or double bubble processes), simple cast/sheet extrusion, co-extrusion, lamination, etc. Conventional simple bubble extrusion processes (also known as hot blown film processes) are described, for example, in *The Encyclopedia of Chemical Technology*, Kirk-Othmer, Third Edition, John Wiley & Sons, New York, 1981, Vol 16, pp. 416-417 and Vol. 18, pp. 191-192. Biaxial orientation film manufacturing processes such as those described in the "double bubble" process of U.S. Pat. No. 3,456,044, and the processes described in U.S. Pat. Nos. 4,352,849, 4,820,557, 4,837,084, 4,865,902, 4,927,708, 4,952,451, 4,963,419 and 5,059,481 can also be used to make the film structures of this invention. Biaxially oriented film structures can also be made by a tenter-frame technique, such as that used for oriented polypropylene.

The thickness of the multilayer structures is typically from 1 to 4 mils (total thickness). Multilayer film structures typically comprise from 2 to 7 layers, but the only limits on the total number of layers are those imposed by economics and practicality. For a monolayer film, the thickness is typically 0.4 to 4 mils, preferably 0.8 to 2.5 mils.

The film structures of the invention can be made into packaging structures such as form-fill-seal structures and bag-in-box structures. Regarding form-fill-seal and bag-in-box structures, one such operation is described in Packaging Foods With Plastics by Wilmer A. Jenkins and James P. Harrington (1991), pp. 78-83. Packages can also be formed from multilayer packaging roll stock by vertical or horizontal form-fill (see packaging and thermoform-fill-seal packaging, as described in "Packaging Machinery Operations: No. 8, Form-Fill-Sealing, A Self-Instructional Course" by C. G. Davis, Packaging Machinery Manufacturers Institute (April 1982); The Wiley Encyclopedia of Packaging Technology by M. Bakker (Editor), John Wiley & Sons (1986), pp. 334, 364-369; and Packaging: An Introduction by S. Sacharow and A. L. Brody, Harcourt Brace Javanovich Publications, Inc. (1987), pp.322-326). A process for making a pouch with a vertical form-fill-seal machine is described generally in U.S. Pat. Nos. 4,503,102 and 4,521,437. Film structures containing one or more layers comprising an ECO copolymer are well suited for the packaging of potable water, wine, condiments, and similar food products.

Extrusion coating is yet another technique for producing multilayer packaging materials. Similar to cast film, extrusion coating is a flat die technique. A film can be extrusion coated or laminated onto a substrate either in the form of a monolayer or a coextruded film. The film structure may also be formed into a lid stock for an injection molded, blow molded or thermoformed tray.

In one embodiment of the invention, the film structure is a shrink film. Upon exposure to heat, a shrink film will either shrink or, if restrained, create shrink tension within the film. This heat reaction is generally activated when the wrapped product is passed through a hot air or hot water shrink tunnel. Generally, this process causes the film to shrink around the product to produce a tight, transparent wrapping which conforms to the contour of the product, while protecting the product from dirt and contamination.

There are two main categories of heat shrink films—hot-blown shrink film and oriented shrink film. Hot-blown shrink film is made by a hot-blown simple bubble film process and, conversely, oriented shrink film is made by elaborate biaxial orientation processes known as double bubble, tape bubble, trapped bubble or tenter framing. Both amorphous and semi-crystalline polymers can be made into oriented shrink films using elaborate biaxial orientation processes. For amorphous polymers, the orientation is performed at a temperature immediately above the glass transition temperature of the polymer. For semi-crystalline polymers, the orientation is performed at a temperature below the peak melting point of the polymer.

Shrink films and their manufacture and use are more fully described in U.S. Pat. Nos. 6,306,969, 5,972,444, 5,852,152, and 5,707,751 and EP 1 532 203 and 1 529 633.

The invention is described more fully through the following examples. Unless otherwise noted, all parts and percentages are by weight.

SPECIFIC EMBODIMENTS

Physical Properties

Test Methods

Samples for density measurement are prepared according to ASTM D1928. Measurements are made within one hour of sample pressing using ASTM D792, Method B.

Melt index, or $I_2$, is measured in accordance with ASTM D1238, Condition 190° C./2.16 kg.

Dart Impact Strength (Dart A): ASTM D1709.

45° Gloss: ASTM D2457.

Total (Overall), Surface and Internal Haze: Samples measured for internal haze and overall haze are sampled and prepared according to ASTM D1003. Internal haze is obtained via refractive index matching using mineral oil on both sides of the films. A Hazegard Plus (BYK-Gardner USA; Columbia, Md.) is used for testing. Surface haze is determined as the difference between overall haze and internal haze as shown in the Equation below. Surface haze tends to be related to the surface roughness of the film, where surface haze increases with increasing surface roughness.

$$\text{Haze} = \text{Internal Haze} + \text{Surface Haze} \quad \text{(Equation)}$$

Puncture is measured on an Instron Model 4201 with Sintech Testworks Software Version 3.10. Specimen size is 6"×6" and 4 measurements are made to determine an average puncture value. The film is conditioned for 40 hours after film production and at least 24 hours in an ASTM controlled laboratory. A 100 lb load cell is used with a round specimen holder 12.56" square. The puncture probe is a ½" diameter polished stainless steel ball with a 7.5" maximum travel length. There is no gauge length; the probe is as close as possible to, but not touching, the specimen. The crosshead speed used is 10"/minute. The thickness is measured in the middle of the specimen. The thickness of the film, the distance the crosshead traveled, and the peak load are used to determine the puncture by the software. The puncture probe is cleaned using a "Kim-wipe" after each specimen.

2% Secant Modulus-MD (machine direction) and CD (cross direction): ASTM D882.

MD and CD Elmendorf Tear Strength: ASTM D1922.

MD and CD Tensile Strength: ASTM D882.

MD and CD Ultimate Elongation: ASTM D822.

MD and CD Yield Strain: ASTM D822.

MD and CD Yield Strength: ASTM D822.

Shrink tension for MD and CD is measured according to the method described in Y. Jin, T. Hermel-Davidock, T. Karjala, M. Demirors, J. Wang, E. Leyva, and D. Allen, "Shrink Force Measurement of Low Shrink Force Films", SPE ANTEC Proceedings, p. 1264 (2008).

Process Materials and Conditions

Four examples are reported, two of the invention and two comparative. The same blown film line is used to create both the films of the invention and the comparison films. The film of Example 1 comprises 85 wt % of an ethylenic copolymer (an LDPE) of ethylene and carbon monoxide (MI or $I_2$ of 0.52 g/10 min, density of 0.930 g/cc and a CO content of 1 wt %) and 15 wt % ELITE 5111G ($I_2$ of 0.85 g/10 min, density of 0.9255 g/cc and without any CO content), both available from The Dow Chemical Company. The film of Comparative Example 1 (CE-1) comprises 85 wt % LDPE 535E (MI of 0.60 g/10 min, density of 0.928 g/cc and without any CO content, also available from The Dow Chemical Company) and 15 wt % ELITE 5111G. The film of Example 2 comprises 60 wt % of the CO-containing LDPE of Example 1 and 40 wt % ELITE 5111G. The film of Comparative Example 2 (CE-2) comprises 60 wt % LDPE 535E and 40 wt % ELITE 5111G. Melt index is measured according to ASTM D1238 (190° C./2.16 kg), and density is measured according to ASTM D792.

Blown films of Examples 1 and 2 and CE-1 and 2 are made on a 6" die with a LLDPE type screw. No internal bubble cooling is used. Pellets of each polymer are physically blended with one another in their proper proportion, and the physical blend of pellets is then fed to the extruder through the pellet hopper. The general blown film parameters used to produce the blown films are reported in Table 1. The reported temperatures begin near the pellet hopper and follow the polymer as it moves to and through the die (melt temperature). The blow-up ratio (BUR) for each film is shown in Table 1, and each film is fabricated to a thickness of 2.5 mil. The film properties are shown in Table 2.

TABLE 1

Blown Film Process Conditions

| | Example | | | |
|---|---|---|---|---|
| | 1 | CE-1 | 2 | CE-2 |
| BUR | 2.0 | 2.0 | 2.5 | 2.5 |
| Barrel T1 (° F.) | 375 | 375 | 375 | 375 |
| Barrel T2 (° F.) | 425 | 425 | 425 | 425 |
| Barrel T3 (° F.) | 350 | 349 | 351 | 351 |
| Barrel T4 (° F.) | 350 | 349 | 351 | 351 |
| Barrel T5 (° F.) | 351 | 349 | 351 | 351 |
| Screen T (° F.) | 439 | 439 | 440 | 441 |
| Adapter T (° F.) | 440 | 442 | 440 | 441 |
| Block T (° F.) | 431 | 448 | 434 | 444 |
| Lower Die Temp. (° F.) | 441 | 439 | 442 | 443 |
| Upper Die Temp. (° F.) | 442 | 437 | 443 | 441 |
| Melt Temp. (° F.) | 430 | 429 | 446 | 434 |

TABLE 2

Film Properties

| Property | Ex. 1 | CE-1 | Difference (%) | Ex. 2 | CE-2 | Difference (%) |
|---|---|---|---|---|---|---|
| Dart A (g) | 151 | 118 | 28 | 258 | 127 | 103 |
| Gloss 45 Degrees (%) | 55.3 | 58.8 | | 58.8 | 53.9 | 9 |
| Haze (%) | 13.3 | 11 | | 13.4 | 12.3 | |
| Internal Haze (%) | 3.5 | 3.7 | | 4.3 | 4.1 | |
| Puncture (Ft.lb/in$^3$) | 47.1 | 50.1 | | 66.3 | 81.9 | |
| 2% Secant Modulus CD (psi) | 37,212 | 44,332 | | 36,308 | 43,207 | |
| 2% Secant Modulus MD (psi) | 33,320 | 38,063 | | 33,306 | 37,780 | |
| Elmendorf Tear CD | 554 | 850 | | 1,113 | 1,077 | |
| Elmendorf Tear MD | 472 | 403 | 17 | 218 | 233 | |
| Ultimate Tensile CD (psi) | 3,581 | 3,090 | 16 | 4,453 | 4,551 | |

TABLE 2-continued

| Property | Ex. 1 | CE-1 | Difference (%) | Ex. 2 | CE-2 | Difference (%) |
|---|---|---|---|---|---|---|
| Ultimate Elongation CD (%) | 698 | 646 | 8 | 694 | 739 | |
| Yield Strain CD (%) | 11.2 | 12.7 | | 13.1 | 12.8 | |
| Yield Strength CD (psi) | 1,955 | 2,224 | | 1,936 | 2.202 | |
| Ultimate Tensile MD (psi) | 4,001 | 3,650 | 10 | 4,617 | 4,288 | 8 |
| Ultimate Elongation MD (%) | 356 | 388 | | 507 | 495 | 2 |
| Yield Strain MD (%) | 13.8 | 13.9 | | 18.2 | 14.4 | 26 |
| Yield Strength MD (psi) | 1,840 | 2,082 | | 1,910 | 2,081 | |
| Shrink Tension MD (psi) | 22.06 | 14.67 | 50 | 16.15 | 12.98 | 24 |
| Shrink Tension CD (psi) | 0.36 | 0.50 | | 0.39 | 0.36 | |

Results

The results reported in Table 2 show significant improvement in a number of mechanical properties without significant compromise of other mechanical properties of the films comprising ECO copolymers as compared to the films without ECO copolymer. While the films comprising ECO copolymers will photodegrade more quickly than a film alike in all respects except without an ECO copolymer (as is well known), these films comprising ECO copolymer also exhibit enhanced Dart A which is important for shrink and toughness. These films also exhibit enhanced gloss (Ex. 2 vs. CE-2) and yield strain MD (Ex. 2 vs. CE-2) which is important for bulls eye appearance or the appearance, for example, of the open edge or area which is the "handle" by which shrink wrapped water bottles or the like can be carried, and MD shrink tension which is important for shrink. In addition the films of this invention exhibit lower modulus for higher density (2% secant modulus CD of Ex. 1 vs. CE-1), enhanced CD and MD Elmendorf tear, and higher ultimate CD and MD tensile and elongation.

Photodegradation

Using the same materials and film fabrication procedures as those described for the measurement of the film physical properties reported in Table 2, five films (each 2.5 mil thick) are subjected to 300 hours of UV light on a QUV tester from Q-lab, Model QUV/se according to ASTM D5208-01. Samples are cut into 3 inch by 4.5 inch pieces as the windows are 2.5 inches by 3.75 inches. Two samples are cut from each window per duration. Three windows are used per sample per duration for a total of six replicates. For every 24 hours in the tester, there are 20 hours of light at 50° C. and 4 hours of darkness at 40° C. Three hundred hours in the QUV tester is equivalent to 250 light hours (which is the Environmental Protection Agency designation of degradation).

Each sample is measured for percent elongation according to ASTM D3826. Samples that have less than 5% elongation after 300 hours in the QUV tester are considered degraded.

Figure 2:
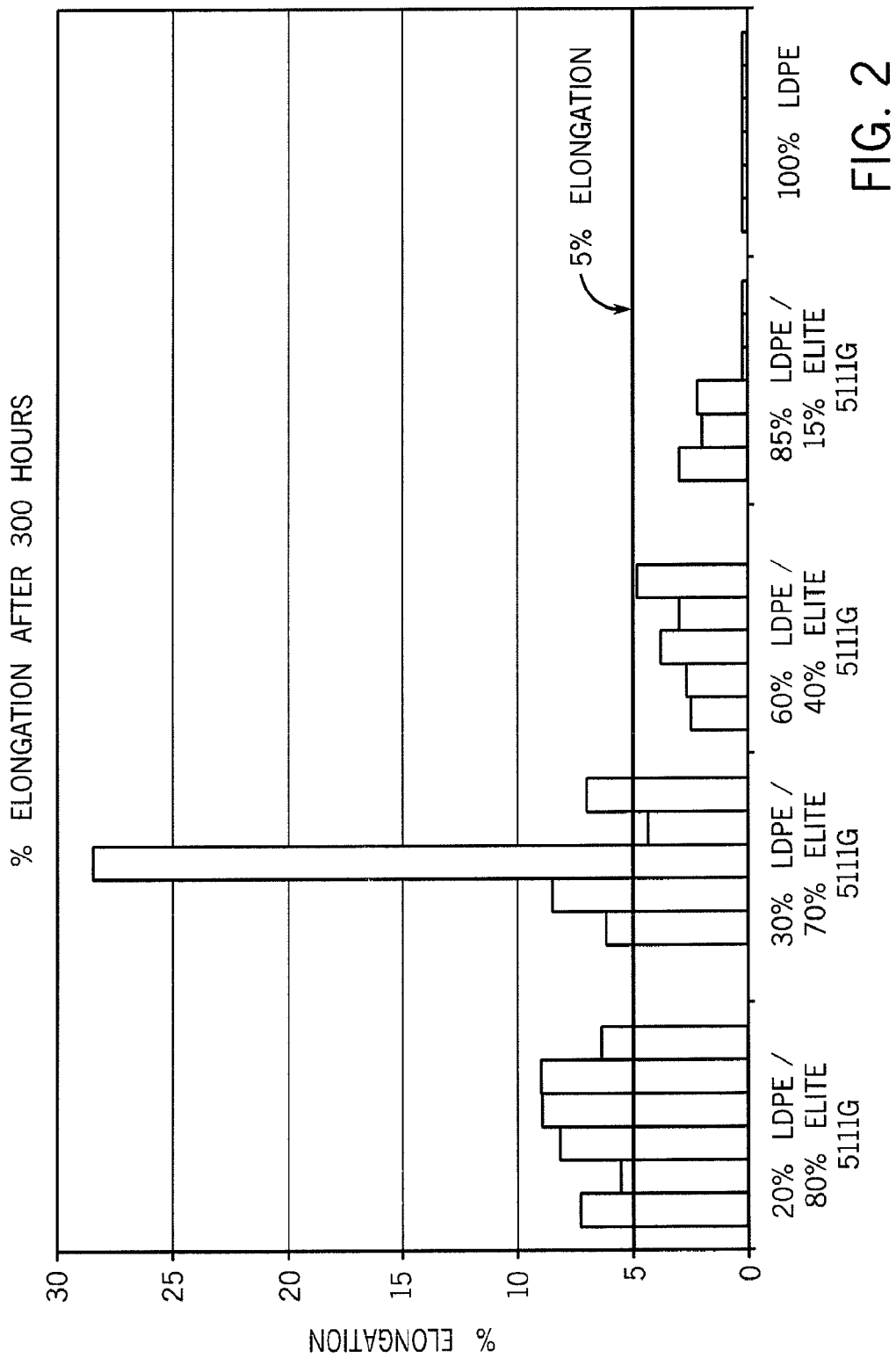
FIG. 2 is a graph reporting the same information reported in FIG. 1 except in bar format.

The results of the QUV and percent elongation testing are reported in FIGS. 1 and 2. Only those samples comprising at least 60 wt % CO-containing LDPE are degraded after 300 hours in the QUV tester.

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A shrink film structure comprising a polymeric blend, the blend comprising (i) 40 to 90 wt % ethylene/carbon monoxide (ECO) copolymer, wherein the ECO copolymer comprises 0.1 to 1 wt % carbon monoxide and (ii) 60 to 10 wt % of at least one ethylene copolymer of LDPE, LLDPE and HDPE.

2. The shrink film structure of claim 1 in which the polymeric blend comprises (i) 60 to 85 wt % LDPE-based ECO copolymer, and (ii) 40 to 15 wt % of at least one ethylenic copolymer of LDPE, LLDPE and HDPE.

3. The shrink film structure of claim 2 in which the ethylenic copolymer is LLDPE.

4. The shrink film structure of claim 1 as a monolayer film.

5. The shrink film structure of claim 1 as a multilayer film in which at least one of the layers comprises the ECO copolymer.

6. The shrink film structure of claim 5 in which at least one film layer is 100 wt % ECO copolymer.

7. The shrink film structure of claim 1 having a MD shrink tension of at least 15 cN.

8. The shrink film structure of claim 1 having Dart impact strength (Dart A) of at least 150 g as measured by ASTM D1709.

9. The shrink film structure of claim 1 further comprising one or more additives.

10. The shrink film structure of claim 9 in which the additive is at least one of an antioxidant, UV absorbing agent, antistatic agent, nucleating agent, lubricant, flame retardant, anti-blocking agent and colorant.

\* \* \* \* \*